US010846880B1

(12) United States Patent
Peterson (10) Patent No.: US 10,846,880 B1
(45) Date of Patent: Nov. 24, 2020

(54) CAMERA EMBEDDED JOYSTICK (71) Applicant: Altec Industries, Inc., Birmingham, AL (US)

(72) Inventor: Daniel D. Peterson, Kansas City, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/733,618

(22) Filed: Jan. 3, 2020

(51) Int. Cl.
*B66C 13/44* (2006.01)
*G06T 7/73* (2017.01)
*G05D 3/10* (2006.01)

(52) U.S. Cl.
CPC ............... *G06T 7/74* (2017.01); *G05D 3/10* (2013.01); *G06T 2207/20081* (2013.01); *G06T 2207/30204* (2013.01)

(58) Field of Classification Search
CPC ....... H04N 7/183; G08B 7/06; G06K 9/00771
See application file for complete search history.

(56) References Cited

U.S. PATENT DOCUMENTS

| 6,594,600 B1 | 7/2003 | Arnoul et al. |
| 6,955,598 B2 | 10/2005 | Hagiwara et al. |
| 2008/0080789 A1* | 4/2008 | Marks ............... A63F 13/10 382/296 |
| 2013/0313042 A1* | 11/2013 | Freeman ............ B66F 11/044 182/19 |
| 2014/0376768 A1* | 12/2014 | Troy ................. G06K 9/3241 382/103 |
| 2016/0075543 A1* | 3/2016 | Lombardo ........... B66F 11/044 187/247 |
| 2018/0146166 A1* | 5/2018 | Chard ................ H04N 7/183 |
| 2018/0337674 A1* | 11/2018 | Rasmussen ......... B66F 11/044 |
| 2019/0011921 A1* | 1/2019 | Wang ................. B64C 39/024 |
| 2019/0064794 A1* | 2/2019 | Chen ................. G05D 1/0044 |
| 2019/0096069 A1* | 3/2019 | Qian ..................... G06T 7/74 |
| 2019/0253611 A1* | 8/2019 | Wang ............... H04N 5/23216 |
| 2019/0322496 A1* | 10/2019 | Hayashi ................ B60R 1/00 |
| 2019/0364426 A1* | 11/2019 | Muthukrishnan .. G06Q 10/0635 |

* cited by examiner

*Primary Examiner* — Mainul Hasan
(74) *Attorney, Agent, or Firm* — Erise IP, P.A.

(57) ABSTRACT

Embodiments of the invention provide for a joystick assembly that separates the user from electrical equipment. In some embodiments, the joystick assembly comprises a handle, a rod, a camera, and a target object. The target object may move indicative of the handle by input from the user. The camera may obtain a target object image of the target object and a difference between the target object image and the image pattern is determined. A signal indicative of the difference between the target object image and the image pattern may be sent to actuate at least one actuator.

20 Claims, 8 Drawing Sheets

CAMERA EMBEDDED JOYSTICK

BACKGROUND

1. Field

Embodiments of the invention are broadly directed to detecting joystick movement. More specifically, embodiments of the invention are directed to detecting joystick movement while providing electrical insulation of a handle of the joystick through an air gap.

2. Related Art

In typical utility work, aerial devices such as, for example, aerial platforms are placed in close proximity to utility lines. Utility workers may perform work on the utility lines and utility poles from the utility lines, transformers, or any electrically charged components. It is desirable to provide electrical insulation between equipment and workers such that the electrical energy is confined to the point of contact as much as possible. Electrically isolating equipment and parts of the utility vehicle prevents the electrical energy from conducting to the workers, down the boom, and to the people and equipment on the ground.

What is needed is a user input system such as a joystick that provides separation for the user from any electrically conductive equipment. The joystick may be electrically insulated by providing an air gap between the user input side and any electrical equipment. The air gap may be large enough to prevent electrical discharge across the gap based on the amount of power that the aerial device may potentially encounter. A camera embedded joystick, as described below, may solve these problems by providing electrical insulation between the user and the electrically conductive components of the system.

SUMMARY

Embodiments of the invention solve these problems by providing a system and method of detecting a user input at a handle by imaging a target object associated with the handle and comparing the target object image with an image pattern, wherein a difference between the target object image and the image pattern is indicative of the user input.

In particular, a first embodiment is directed to a joystick assembly for detecting a user input of the joystick assembly, the joystick assembly comprising a handle receiving the user input, a target object connected to the handle by a rod and moving indicative of the input received at the handle, a camera obtaining a target object image of the target object, a processor generating an image pattern and comparing the target object image and the image pattern, determining a relative position of the target object image to the image pattern, and determining a relative orientation of the target object image to the image pattern, wherein the target object image is indicative of a position and an orientation of the target object.

A second embodiment is directed to a method of detecting a position and an orientation of a handle of a joystick assembly, the method comprising the steps of receiving a user input at the handle connected to a target object, obtaining a target object image of the target object with a camera, wherein the target object image is indicative of a position and an orientation of the target object, comparing, using a processor, the target object image with an image pattern, determining, using the processor, a relative location and a relative orientation of the target object relative to the image pattern, and sending, using the processor, a signal indicative of the location and the orientation of the target object to actuate at least one actuator.

A third embodiment is directed to a joystick assembly for detecting a user input of the joystick assembly, the joystick assembly comprising a handle receiving the user input, a target object connected to the handle and moving indicative of the user input received at the handle, a camera obtaining a target object image of the target object, wherein the target object image is indicative of a position and an orientation of the target object, wherein the target object and the camera are separated by an air gap for preventing electrical discharge across the air gap, and one or more non-transitory computer-readable media storing computer-executable instructions that, when executed by a processor, perform a method of comparing the target object image with an image pattern, the method comprising the steps of comparing the target object image and the image pattern, and transmitting, using a transmitter, a signal indicative of a difference between the target object image and the image pattern, at least one actuator receiving the signal and actuating based on the signal indicative of the difference between the target object and the image pattern.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the invention separate a user providing user input to control equipment from electrical components of the equipment. In some embodiments, a joystick assembly is mechanically and electrically separated from electrically conductive equipment and sensors that detect the movement of the user input. In some embodiments, the joystick assembly comprising a handle is disposed in a utility platform assembly and actuated by a utility worker manipulating the handle. A rod connected to the handle translates the movement to a target object on an end of the rod distal the handle. A camera may be disposed in proximity to the target object but separated by space or an air gap. The camera may view the target object and detect movement of the target object by comparing the target object to an image pattern either digitally projected in the image of the target object or physically placed between the target object and the camera. The air gap may provide a mechanical and electrical barrier such that high-power electrical energy may not discharge from the target object to the camera and electrical equipment or vice versa. In some embodiments, an additional dielectric barrier may be disposed between the camera and the target object.

In some embodiments, the camera is connected to data storage storing non-transitory computer-readable media that, when executed by a processor, recognizes and compares the target object image indicative of the target object location and orientation with the image pattern and transmits a signal to an actuator to move equipment indicative of the input at the joystick assembly handle. In some embodiments, the joystick assembly system provides a user input that controls elements of a utility vehicle while being mechanically and electrically separated from the electrical wiring and controls of the utility vehicle.

Figure 1:
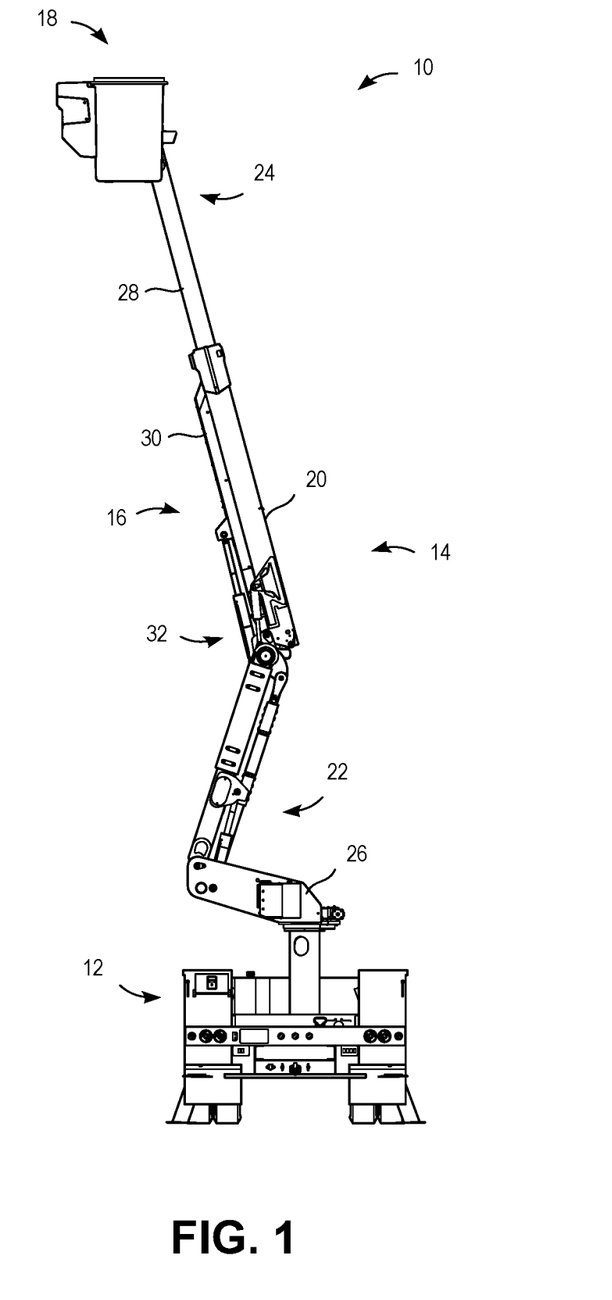
FIG. 1 depicts an exemplary utility vehicle for use with embodiments of the invention.

FIG. 1 depicts a utility vehicle 10 comprising a base 12 and an aerial device 14. The aerial device 14 comprises a boom assembly 16 and a utility platform assembly 18. The boom assembly 16 comprises a boom 20 with a proximal end 22 and distal end 24. The boom assembly 16 may be mounted onto the base 12 with a rotatable boom turret 26 for rotating the boom assembly 16. The utility platform assembly 18 may be attached to the boom assembly 16 at the distal end 24 by an attachment assembly (not shown). Though the base 12, as shown, is a boom truck, in some embodiments, the base 12 may be a digger derrick, crane, or any other vehicle capable of transporting the aerial device 14.

In some embodiments, the boom assembly 16 comprises an inner boom segment 28 and outer boom segment 30 for telescopically extending the boom assembly 16 to place the utility platform assembly 18 proximate utility lines. The movement of the boom assembly 16 and the utility platform may be a result of hydraulics 32. The hydraulics 32 may be controlled by input at the utility platform assembly 18 and the base 12 using the joystick assembly described in embodiments below.

Figure 2:
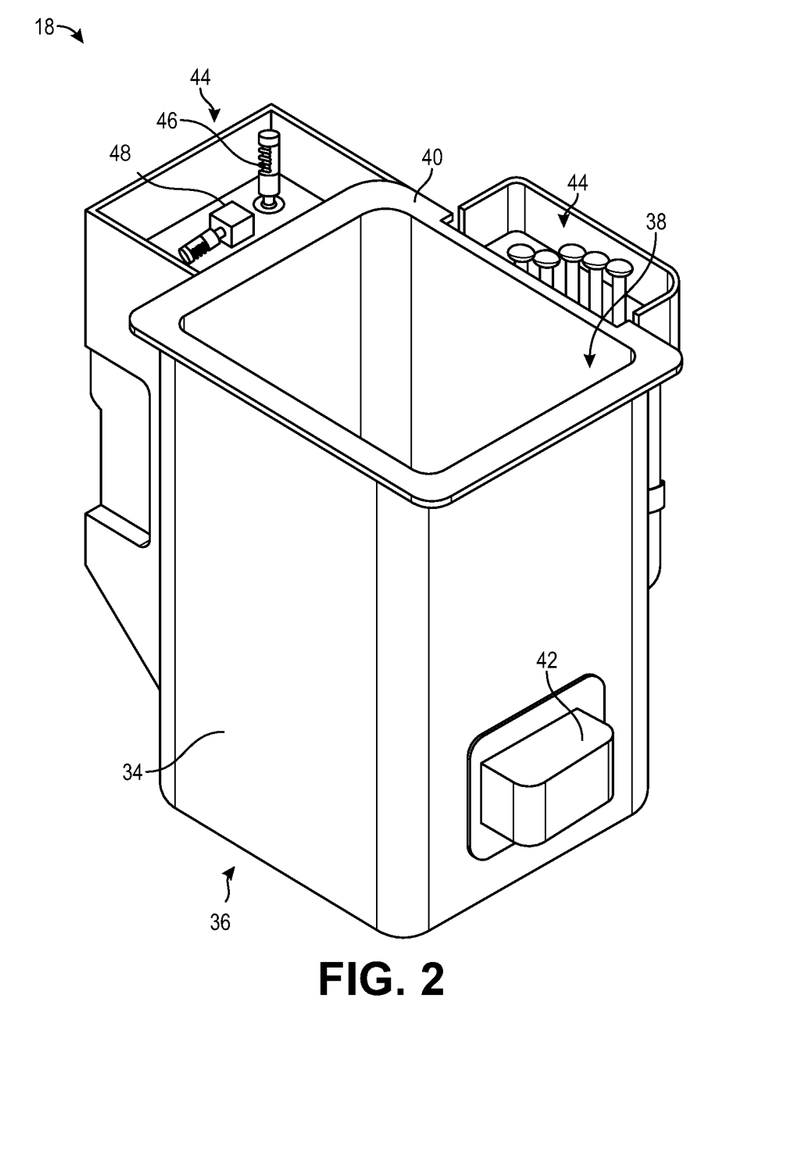
FIG. 2 depicts an embodiment of a joystick assembly in an exemplary utility platform assembly.

The utility platform assembly 18, as best illustrated in FIG. 2, provides an elevated surface from which at least one utility worker can perform a task. In some embodiments, the utility platform assembly 18 comprises four bucket sidewalls 34 and a bucket floor 36 that collectively form a cavity 38. The utility platform assembly 18 may also present a bucket lip 40 along a top portion of at least one bucket sidewall. The utility platform assembly 18 may further comprise a step 42 and/or a door (not illustrated) in at least one of the bucket sidewalls to allow for ingress and egress of the utility worker. The utility platform assembly 18 may also comprise a handrail (not illustrated).

In some embodiments, the utility platform assembly 18 further comprises a set of controls 44. The set of controls 44 may be configured to be manipulated by the operator standing in the utility platform assembly 18 so as to move the utility platform assembly 18 and/or the boom assembly 16 to a desired location and configuration. In embodiments, the set of controls 44 utilize hydraulic power that is supplied in the form of a hydraulic fluid by a set of hydraulic lines (not illustrated).

In some embodiments, the set of controls 44 allows the operator to move the aerial device 14 from within the utility platform assembly 18. The operator in the utility platform assembly 18 has a better vantage point to know where and how to position the boom assembly 16 as opposed to the operator on the ground. Additionally, the set of controls 44 promotes efficiency by allowing the operator to directly control the movement of the boom assembly 16 and the utility platform 18. In some embodiments, the set of controls 44 is provided at the base 12 to allow an operator on the ground to control the boom assembly 16 and the utility platform assembly 18.

In some embodiments, the controls 44 may comprise a joystick assembly 46 for controlling the boom assembly 16, the turret 26, and the utility platform assembly 18 as well as other functions. The joystick assembly 46 may be mounted in an upright or vertical position or horizontally as shown. Further, the joystick assembly 46 may be mounted with a housing 48. In some embodiments, the housing 48 may be a base plate attached to the utility platform assembly 18.

Figure 3:
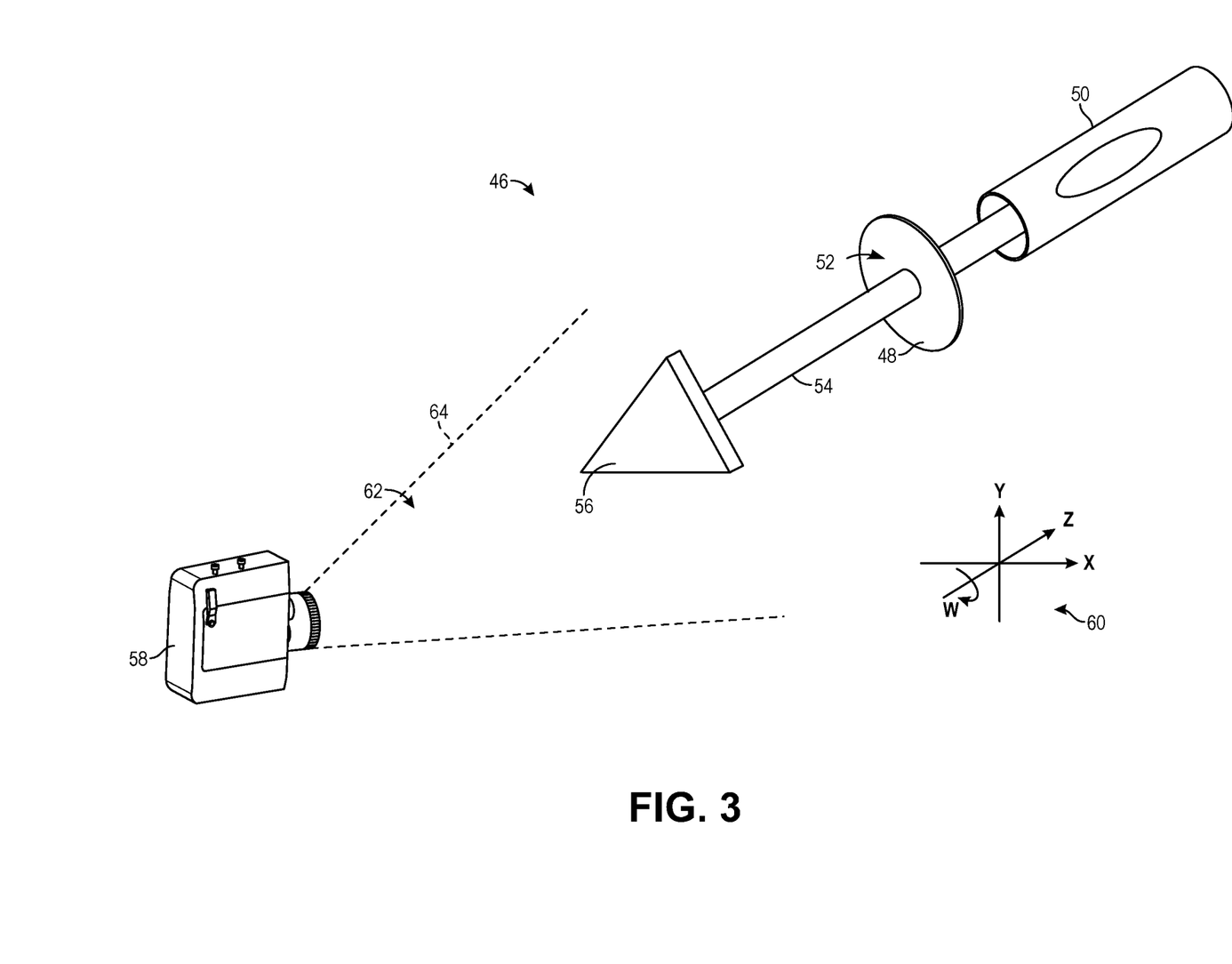
FIG. 3 depicts an embodiment of a joystick assembly.

FIG. 3 depicts the joystick assembly 46 comprising a handle 50, an attachment point 52, a portion of the housing 48, a rod 54, a target object 56, and a camera 58. In some embodiments, the camera 58 is connected to the rod 54 and the handle 50 through the housing 48. The camera 58, the target object 56, and at least a portion of the rod 54 may be contained in the housing 48.

In some embodiments, the handle 50 is configured for input by the utility worker in the utility platform assembly 18 or at the base 12. The handle 50 may be disposed vertically or horizontally as depicted in FIG. 2. The handle 50 may comprise a non-conductive material such as a polymer or, in some embodiments, may be conductive such as metal. The handle 50 may further be configured with additional inputs such as switches, knobs, buttons, and levers. The additional inputs may be connected to utility vehicle controls for controlling the boom assembly 16 and the utility platform assembly 18. The additional inputs may be connected by wiring or may be transmitted by a transmitter housed in the handle 50 or otherwise in the joystick assembly 46.

In some embodiments, the rod 54 connects the handle 50 and the target object 56. The rod 54 may be attached to the utility platform assembly 18 at the attachment point 52 that may provide for translation and rotation of the rod 54. Further, the attachment point 52 may provide a pivot point for the rod 54 such that when the handle 50 is moved in a direction, the target object 56 moves in the opposite direction. At the attachment point 52 the rod 54 may be attached to the housing 48 such that the rod 54 has at least four degrees of freedom. In some embodiments, the four degrees of freedom may be represented by the exemplary coordinate system 60. The four degrees of freedom may be the exemplary x-axis, y-axis, and z-axis, and a rotation about the z-axis referenced as w-rotation. In the embodiment depicted in FIG. 3, the z-axis is coaxially aligned with the longitudinal axis of the rod 54 and the handle 50 and perpendicular to the mounting plate or housing 48. In some embodiments, the rod 54 is made of a non-conductive material for preventing electrical discharge through the rod 54. The rod 54 may be made of a polymer. Alternatively, in some embodiments, the rod 54 may be made of metal.

In some embodiments, the rod 54 may be attached to the housing 48 at any point along the rod 54 such that when the handle 50 is moved the rod 54 pivots about the housing 48. The rod 54 may also be connected such that the rod 54 may be pulled up and pushed down along the z-axis and rotated about the z-axis. The housing 48 may comprise a mounting plate to connect the rod 54 and may provide another layer of electrical insulation between the user and the camera 58 and electrical components.

In some embodiments, the target object 56 is attached at an end of the rod 54 distal the handle 50. The target object 56 may be a specific shape that allows recognition of the location of the target object 56 through imagery obtained by the camera 58. For example, the shape and orientation or the target object 56 may change as the handle 50 is moved by the user. The relative differences in the shape and orientation of the target object 56 may be indicative of the magnitude and direction that the handle 50 is moved by the user. This movement may be obtained by the camera 58 and generated into an image such that the movement may be recognized as described below.

As depicted, the shape of the target object 56 is a triangle. However, the shape may be circular, square, rectangular, any polygon, or irregular shape that may be compared to an image pattern as described below. If the target object 56 is circular, a circular shape rotation would not be recognized if the handle 50 is rotated. However, if the target object 56 is circular, the circular object may have designs, or graphics, that may be recognized. For example, in some embodiments, the target object 56 may comprise recognizable numbers, a grid, stripes, colors, textures, or any other recognizable feature and graphic. The recognizable features and graphics may be present on the target object 56 such that the camera 58 may detect location, orientation, size, and shape of the target object 56.

In some embodiments, the rod 54 pivots about the attachment point 52 between the handle 50 and the target object 56 such that the target object 56 may move in an opposite direction in the x-y plane. For example, the handle 50 may be moved in the positive x-direction. As the rod 54 pivots at the attachment point 52, the target object 56 moves in the negative x-direction. Similar movement occurs in the y-direction.

In some embodiments, the camera 58 may be contained in the housing 48 with the target object 56 and at least a portion of the rod 54. The housing 48 or a mounting plate may be connected to the rod 54 such that the joystick assembly 46 is one mountable piece. The housing 48 may comprise a non-conductive polymer such as plastic. In some embodiments, the camera 58 is completely separate from the target object 56, rod 54, and handle 50.

In some embodiments, the system may be calibrated by setting the target object 56 in a neutral position and aligning an object pattern with the target object 56 in the camera 56 field of view 64. The neutral position of the handle 50 may be a position where no movement of the aerial device 14 is expected and no input from the user is provided. The handle 50 may be moved and thus moving the target object 56. The movement of the target object 56 relative to the movement of the stationary image pattern may be recorded. The user may move the handle 50 to full x-direction, full y-direction, and full z-direction. Once the full positions are recorded relative to the neutral or zero positions, the information may be stored for operation. The sequence may be repeated as many times as needed to have a high confidence in the results. Further, in some embodiments, speed control may be a function of a fraction of full when full is a designated speed. Further, the functions controlling the speed and movement of the equipment indicative of the input may be based on hydraulics, actuators, load, and power levels.

In some embodiments, there is an air gap 62 between the camera 58 and the target object 56. The air gap 62 creates a separation between the user interface and the electrical equipment. The air gap 62 may be viewed as a dielectric gap. The dielectric gap is a space of air between the camera 58 and the electrical equipment and the user input. This air gap 62 may function to prevent an electrical discharge from one side of the air gap 62 to the other. In some embodiments, the utility platform assembly 18 may be in close proximity to high-power electrical lines. In the event of contact between the power lines and the utility platform assembly 18, the air gap 62 may prevent the electrical power from conducting down the power lines through the electrical equipment and to the utility worker using the joystick assembly 46.

In some embodiments, a dielectric plate (not shown) may be disposed between the camera 58 and the target object 56. The dielectric plate may comprise a polymer or glass and may be transparent such that the camera 58 can capture an image of the target object 56 while providing extra resistance to electrical discharge.

Figure 4:
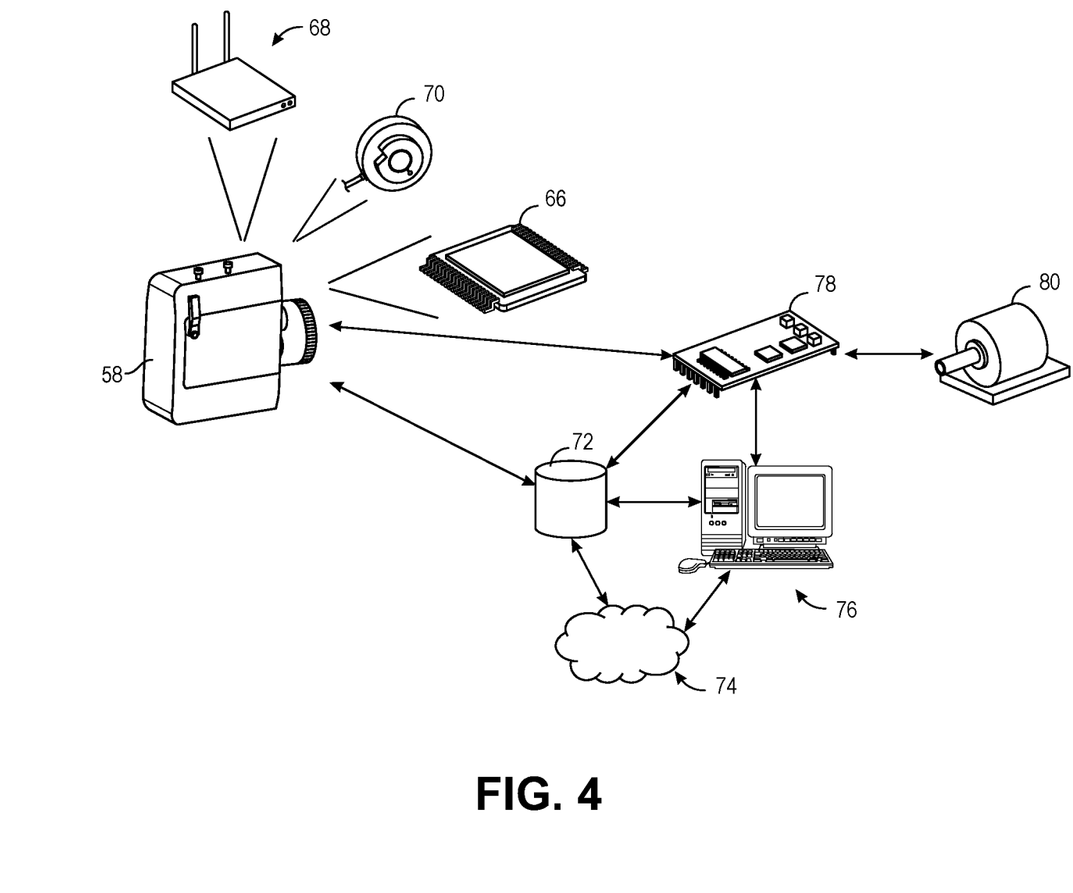
FIG. 4 depicts exemplary components for use with embodiment of a joystick assembly.

As depicted in FIG. 4, in some embodiments, the camera 58 may connect to, or comprise, a processor 66 for receiving image information from the camera 58 and determining an appropriate signal to send to electrical components for movement of the appropriate utility vehicle 10 equipment. The electrical components associated with the camera 56 may be a transceiver 68, a sensor 70, a data store 72 a network 74, a second processor 76 or computer, a controller 78, and at least one actuator 80.

In some embodiments, the electrical components may be utilized to generate a target object image 82 of the target object 56, best seen in FIGS. 5A-F, and access one or more non-transitory computer-readable media that, when executed by the processor 66, recognizes and compares the target object image 82 with an image pattern 84 and determines an output indicative of the handle 50. The output may be combined with data processed from any other sensor 70 and sent via the transceiver 68 or wired communication to any of the above mentioned components. The output signal may be sent directly, or via the controller 78, to the at least one actuator 80. The at least one actuator 80 may be operable to control hydraulic, pneumatic, and electrical system for moving at least the boom assembly 16, utility platform assembly 18, turret 26, and any other components of the aerial device 14 and the utility vehicle 10. The output signal may be received at the second processor 76 via the network 74 and send information indicative of the output signal over a local or broad network. The system may also send information to the base 12 of the utility vehicle 10 or to the utility platform assembly 18 such as location and orientation information of the boom assembly 16 and the utility platform assembly 18. The information may also be alarms or alerts based on the location, orientation, and the speed of the movement of the utility vehicle 10 components.

In some embodiments, the electrical components may have their own designated power supply such that power is not provided by the utility vehicle 10. The electrical components may be operational completely independently of the base 12 and the boom assembly 16 and all communication may be sent wirelessly. This completely isolates the electrical components from the base 12 and the user.

FIGS. 5A-F depict an exemplary object image 82 created by the camera 58 obtaining an image of the target object 56 and overlaying an image pattern 84. In some embodiments, the image pattern 84 is digitally overlaid by the processor 66 in the camera 58 and in some embodiments, a physical image is mounted between the camera 58 and the target object 56. In some embodiments, the processor 66 is connected to the camera 58 and the object image 82 of the target object 56 is sent to the processor 66 where the image of the target object 56 is compared to the image pattern 84. When both the object image 82 and the image pattern 84 are combined, the target object 56 in the object image 82 may be compared to the image pattern 84 to determine a shape and orientation of the target object 56 relative to the image pattern 84. The differences between the object image 82 and the image pattern 84 may be indicative of the input by the user. Further, a signal may be sent to corresponding equipment of the utility vehicle 10 indicative of the input and based on the difference determined to move the equipment accordingly.

Figure 5A:
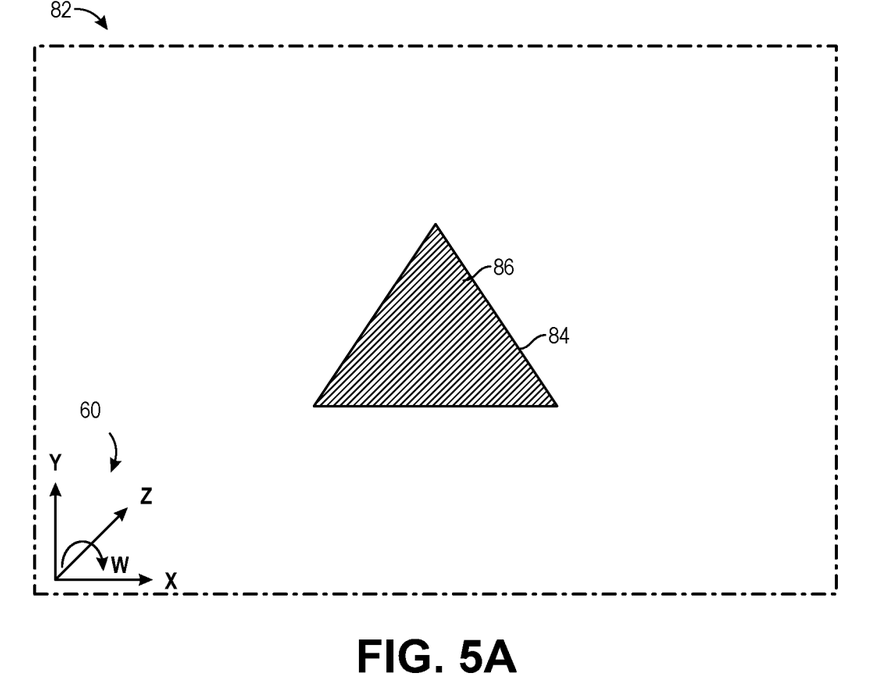
FIG. 5A-F depicts embodiments of a target object image of a target object captured by a camera and an image pattern.

FIG. 5A depicts the target object image 86 and the image pattern 84 aligned in the object image 82. The target object image 86 and the image pattern 84, as depicted, are discernable as the target object 56 is in the neutral position (no input). As such, there is no difference between the target object image 86 and the image pattern 84 as the exemplary image pattern 84, here, is an outline of the target object 56 in the neutral position. Here, the target object image 86 is the representation of the target object 56 in the object image 82. The target object image 86 may be the target object 56 as seen through the camera 58. In some embodiments, the image pattern 84 may be a any other shape that may be compared to the target object image 86. In some embodiments, the image pattern 84 may comprise numbers, a grid, stripes, dots, or any other graphic that may quantify the magnitude and direction of the movement of the target object 56.

In some embodiments, the target object image 86 location and orientation may be recognized by utilizing object recognition software. The object recognition may be performed by comparing the shape of the target object image 86 to a database of known shapes with prior information about the target object 56 shape. In some embodiments statistical algorithms, neural networks, and any machine learning algorithm may be used to determine the shape, location, and orientation of the target object image 86. The shape, location, and orientation of the target object image 86 may then be compared to the image pattern 84 to generate at least one signal to transmit and move other devices of the utility vehicle 10.

Figure 5B:
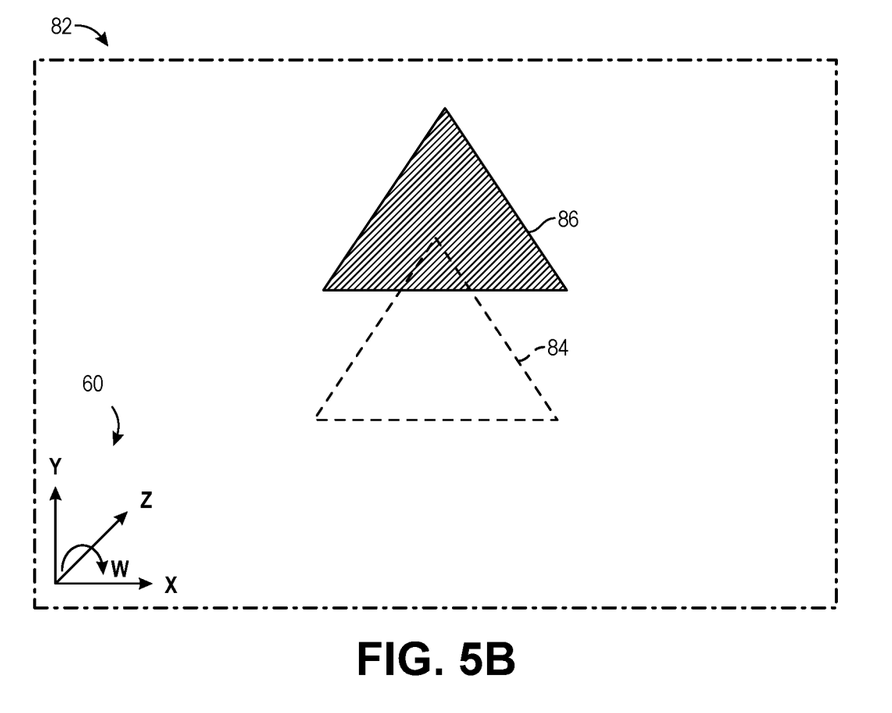

FIG. 5B depicts the object image 82 with a target object translation in the positive y-direction depicted in the coordinate system 60. The handle 50 is moved in a direction that causes the target object 56 to be moved in the y-direction. The image pattern 84 remains in the centrally located position and the target object image 86, representative of the position of the target object 56, has moved into a different position on the y-axis. The target object image 86 is indicative of the target object 56 movement, which is in turn indicative of the input by the user at handle 50. The target object image 86 is compared to the image pattern 84 to determine a difference. The difference is used to generate a signal to send to control movement of a corresponding element or device of the utility vehicle 10 (i.e. the boom assembly 16 and the utility platform assembly 18). Based on the attachment point 52, target object 56 translation in the y-direction may indicate handle 50 movement in the negative y-direction. In the embodiments described herein, this is a movement indicative of a handle 50 moved towards the user. The same correspondence between the handle 50 and the target object image 86 may be made in relation to FIGS. 5B-F described below.

Figure 5C:
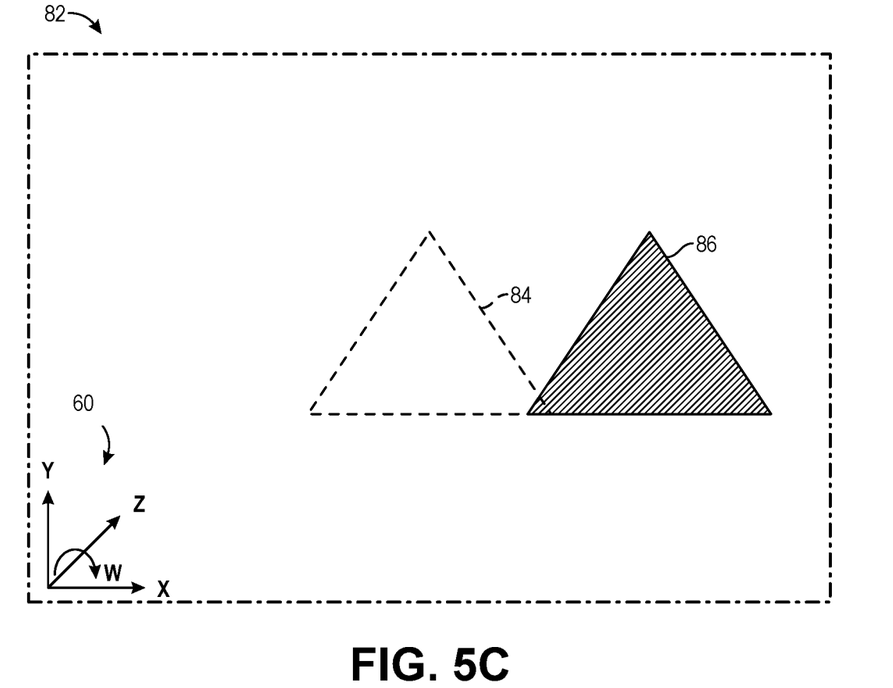

FIG. 5C depicts the target object image 86 translation in the x-direction. Similarly, as described above, the translation in the x-direction may be indicative of a handle 50 movement in the negative x-direction. The difference between the target object image 86 captured by the camera 58 and the image pattern 84 is determined and a signal to move the utility vehicle 10 equipment is accordingly sent as described above.

Figure 5D:
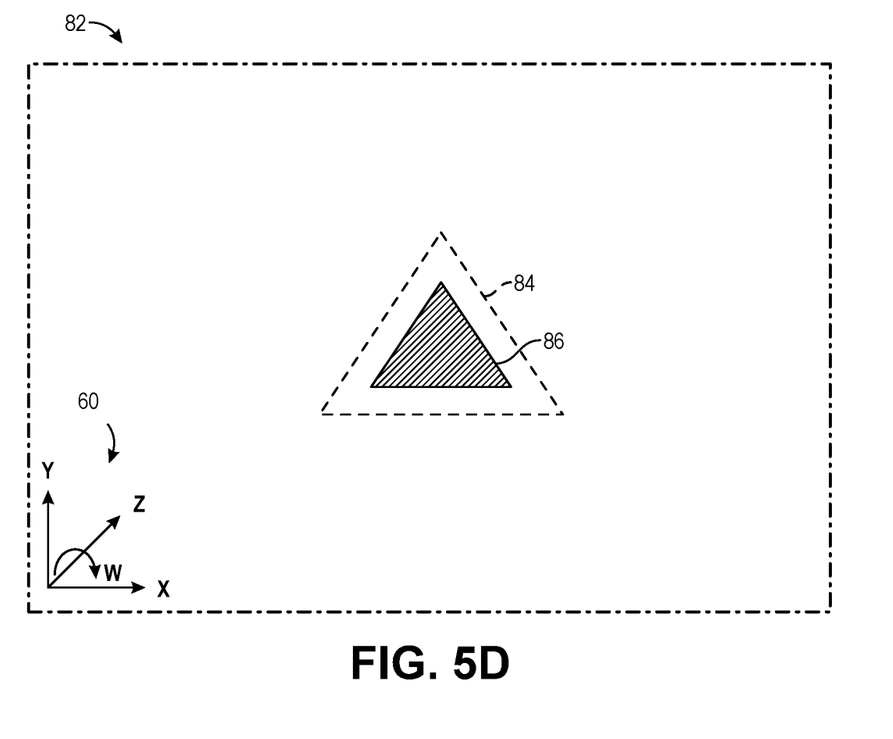

FIG. 5D depicts the target object image 86 translation in the z-direction. Translation of the target object 56 along the z-axis may create a target object image 86 that is larger when moved in the negative z-direction and smaller when the target object 56 is move in the z-direction. The difference may be measured by recognizing that all sides of the target object image 86 are within the image pattern 84 or that all sides are outside of the image pattern 84. In some embodiments, the area of the target object image 86 is calculated and the z-direction translation is determined by a change in the calculated area of the target object image 86 compared to the area of the target object image 86 when the target object 56 is in the neutral position. For example, if the area of the target object image 86 is less than the equilibrium area of the target object image 86 or the area of the image pattern 84, it may be determined that the target object 56 has moved in the z-direction. If the area of the target object image 86 is larger than the area of the equilibrium target object image 86 or the area of the image pattern 84, it may be determined that the target object 56 has moved in the negative z-direction.

In some embodiments, the target object image 86 may be representative of the target object 56 moving towards and away from the camera 58. For example, the user input may pull the handle 50 up along the z-axis thus moving the target object 56 away from the camera 58 making the target object image 86 area decrease. Likewise, the user input may push the handle 50 down towards the camera 58 causing target object 56 to move closer to the camera 58, thus causing the target object image 86 to increase area. The difference between the target object image 86 captured by the camera 58 and the image pattern 84 is determined and a signal to move the utility vehicle 10 equipment is accordingly sent.

Figure 5E:
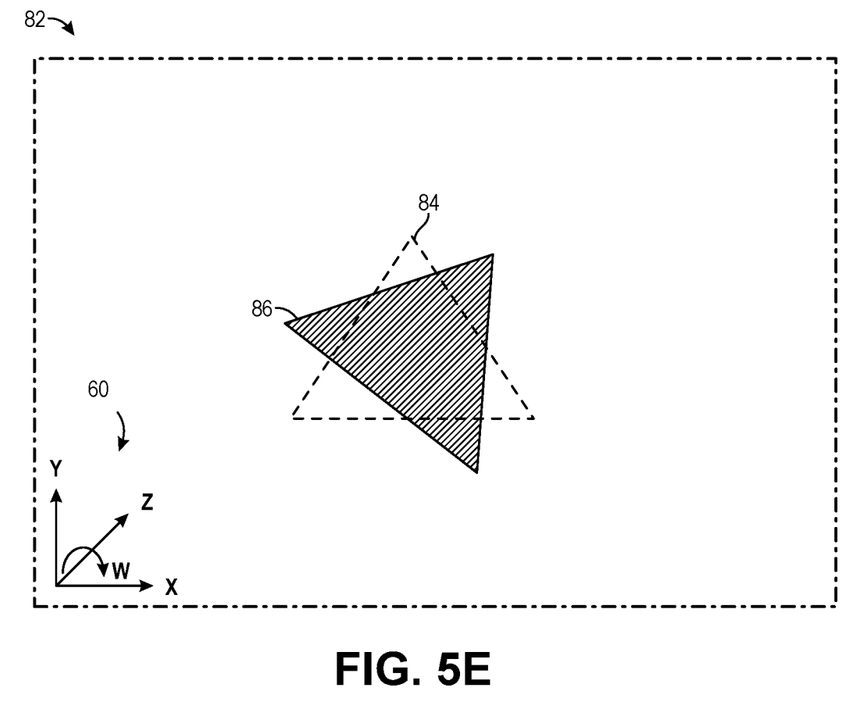

FIG. 5E depicts a target object image 86 rotation in the w-direction. The target object 56 is rotated about the z-axis thus causing an orientation change in the target object image 86. In this exemplary embodiment using a triangle as the target object 56, the target object image 86 rotation may be limited to 45 degrees such that it is discernable that the target object 56 is rotated in the positive w-direction rather than the negative w-direction. The rotation may be determined by distance between points or determining an angle of rotation. Either way, all rotations and translations may be combined to determine a total magnitude and orientation change of the target object image 86 relative to the image pattern 84 indicative of the movement of the target object 56 and the input of the user.

Figure 5F:
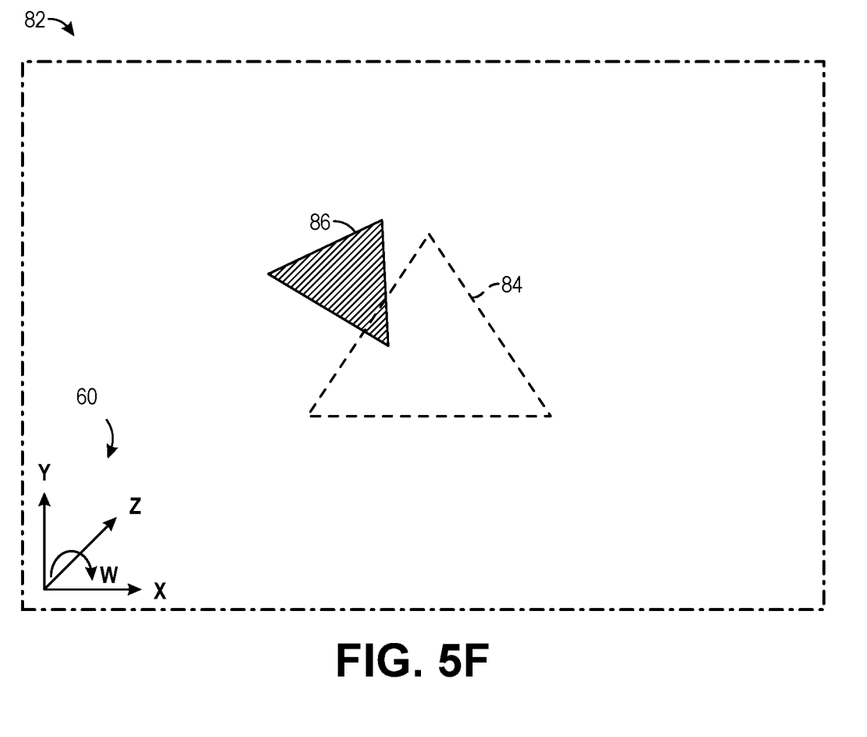

FIG. 5F depicts a target object 56 translation in the −x-direction, y-direction, z-direction, and rotation in the w-direction. The translations and the magnitude and orientation are combined to determine a signal to send to electromechanical devices, such as the actuator 80, to move the utility vehicle equipment (i.e. the boom assembly 16 and the utility platform assembly 18). The signal and the movement of the equipment may be indicative of the movement of the handle 50 and the input by the user.

In some embodiments, a stored history of movements is used to determine a speed of movement. Any information indicative of the movement of the handle 50 such as, for example, the difference between the target object image 86 and the image pattern 84, may be stored such that a rate of change between the four measurable dimensions can be determined. The rate of change may be used to determine the speed at which the boom assembly 16 and utility platform assembly 18 are moved.

In some embodiments, the difference between the target object image 86 and the image pattern 84 is determined by a statistical algorithm, a neural network, and any other machine learning technique and comparative and adaptive algorithms. Any mathematical method that may be used to recognize and compare the location and the orientation of the target object image 86 and the image pattern 84 may be used. In some embodiments, a signal indicative of the target object image 86 position and orientation may be sent to move the utility vehicle 10 components.

Figure 6:
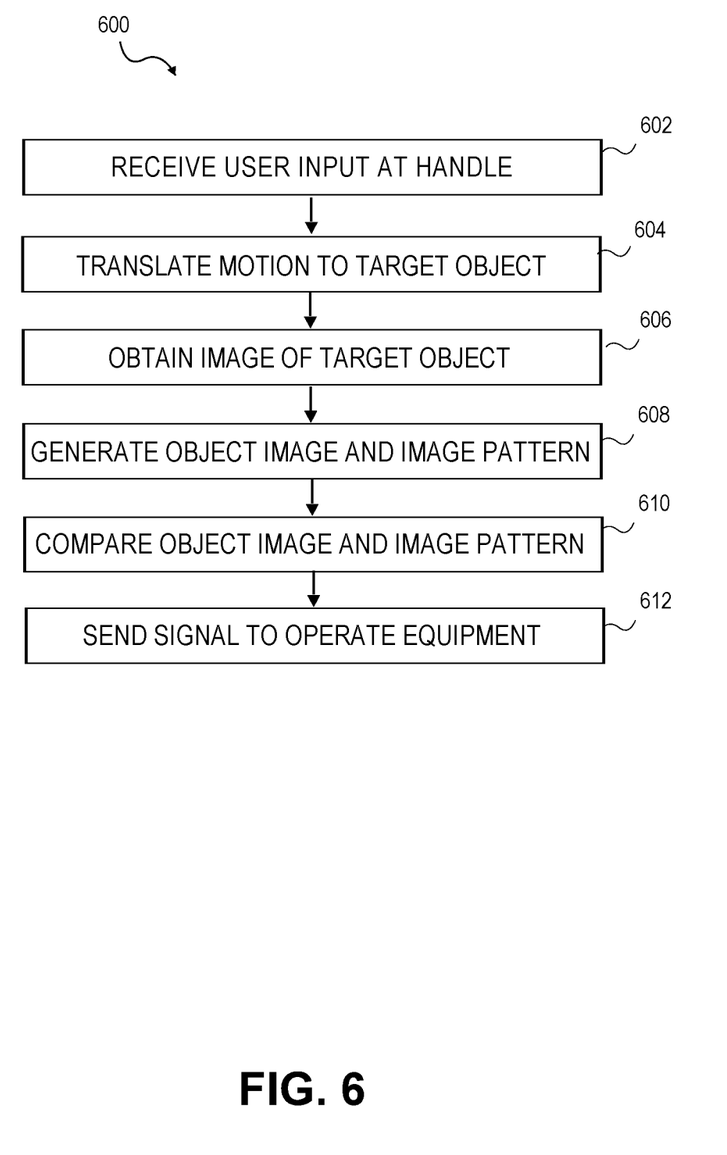
FIG. 6 depicts a flow diagram of an exemplary method of using the joystick assembly.

FIG. 6, depicts the exemplary method of determining a handle position generally referenced by the numeral 600. At step 602, input from the user is received at the handle 50 as described in embodiments above. The joystick assembly 46 may be disposed in the utility platform assembly 18, at the base 12, or at any location on the utility vehicle 10. The user may provide input at the handle 50 to control the boom assembly 16, the utility platform assembly 18, or any other device of the utility vehicle 10. The handle 50 may comprise electrically insulative material such as, for example, polymer.

At step 604, the user input at the handle 50 is translated to the target object 56 by rod 54. In some embodiments, as described above, the rod 54 may be attached to the utility platform assembly 18 directly or through a housing 48. The rod 54 may pivot, translate, and rotate providing four degrees of freedom for movement of the rod 54, handle 50, and target object 56. The joystick assembly 46 may be attached to the housing 48 such that a movement by the handle 50 in one direction results in a movement of the target object in the opposite direction as described above.

At step 606, the camera 58 obtains the object image 82 of the target object 56 as described in embodiments above. The target object image 86 is the representation of the target object 56 in the object image 82. The camera 58 may be separated from the target object 56 by an air gap 62 to prevent electrical discharge from the camera 58 to the target object 56. The air gap 62 distance may be based on an expected electrical power (e.g., power lines) that may be in close proximity to the utility platform assembly 18.

At step 608, the image pattern 84 is generated in the object image 82 such that it may be compared to the target object image 86 as described in embodiments above. The target object 56 may be any shape that is known and can be replicated, or generated, by the processor 66 to create the image pattern 84. In some embodiments, the image pattern 84 may be created when the target object 56 is photographed when the handle 50 is in the neutral position. The neutral position may be a position when no movement of the boom assembly 16 and utility platform assembly 18 is expected, or no input is provided to the joystick assembly 46. In some embodiments, the image pattern 84 is stored at the data store 72 and selected from a plurality of shapes automatically after image recognition of the target object 56 or by the user.

In some embodiments, the image pattern 84 may be an outline of the target object 56 or any shape that may be compared to the target object image 86. In some embodiments, the image pattern 84 may be a grid, lines, dots, or any other pattern that may indicate magnitude and direction as well as speed of movement of the target object 56.

At step 610, computer-executable instructions stored on one or more non-transitory computer-readable media are executed by the processor 66 to perform functions. The target object image 86 may be compared to the image pattern 84 to determine a difference or a change from a previous relative position. The difference may be indicative of the movement of the handle 50 and movement of the target object 56.

At step 612, signals may be sent to at least one actuator 80 to control utility vehicle equipment such as the boom assembly 16 and the utility platform assembly 18. In some embodiments, a plurality of signals may be sent to a plurality of actuators for controlling the utility vehicle 10 equipment. The utility vehicle 10 equipment may be controlled using hydraulic, pneumatic, and electromechanical actuators.

The steps and components described above may be used in any combination, omitted, or substituted in any combination to achieve the described results. It should be appreciated that, while the above disclosure has been generally directed to the field of utility vehicles and utility maintenance and repair, the joystick assembly 46 may be used anywhere and in any context of use for a joystick-type input. Further, the joystick assembly 46 may be used anywhere that a separation between the electrical components and the user input may be beneficial.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A joystick assembly for detecting a user input of the joystick assembly, the joystick assembly comprising:
   a handle receiving the user input;
   a target object connected to the handle by a rod,
      wherein the target object moves indicative of the input received at the handle;
   a camera obtaining a target object image of the target object;
   a housing,
      wherein the camera and the target object are disposed in the housing;
   a processor generating an image pattern and comparing the target object image and the image pattern;
      determining a relative position of the target object image to the image pattern; and determining a relative orientation of the target object image to the image pattern,
wherein the target object image is indicative of a position and an orientation of the target object.

2. The joystick assembly of claim 1, wherein the processor sends a signal indicative of the relative position of the target object image and the relative orientation of the target object image to at least one actuator for controlling an aerial device.

3. The joystick assembly of claim 2,
wherein the handle moves with at least four degrees of freedom, and
wherein the signal is indicative of a rotation of the handle.

4. The joystick assembly of claim 3, wherein the camera and the target object are separated by an air gap to prevent a discharge of electricity across the air gap.

5. The joystick assembly of claim 4, wherein the distance from the camera to the target object is based at least in part on an amount of electric energy in utility lines in proximity to the aerial device.

6. The joystick assembly of claim 1, wherein the target object image is a graphic generated by the processor.

7. The joystick assembly of claim 6, wherein the image pattern is indicative of the shape of the target object.

8. The joystick of claim 7, wherein the shape of the target object is a triangle and the image pattern is an outline of the triangle when the target object is in a neutral position with no user input.

9. The joystick assembly of claim 1, wherein the image pattern is a graphic that quantifies the magnitude of movement of the target object.

10. A method of detecting a position and an orientation of a handle of a joystick assembly, the method comprising the steps of:
receiving a user input at the handle connected to a target object,
wherein the target object moves indicative of the user input received at the handle;
obtaining a target object image of the target object with a camera,
wherein the target object and the camera are disposed in a housing,
wherein the target object image is indicative of a position and an orientation of the target object;
comparing, using a processor, the target object image with an image pattern;
determining, using the processor, a relative location and a relative orientation of the target object image relative to the image pattern; and
sending, using the processor, a signal indicative of the location and the orientation of the target object to actuate at least one actuator.

11. The method of claim 10, wherein the camera and target object are separated by an air gap to prevent a discharge of electricity across the air gap.

12. The method of claim 11,
wherein the at least one actuator controls the location of a utility platform, and
wherein the relative location and relative orientation of the target object image is determined using a machine learning algorithm.

13. The method of claim 12, wherein a length of the air gap is based on an electric power associated with utility lines in proximity to the utility platform.

14. The method of claim 10, wherein the image pattern comprises graphics for comparison to the target object image.

15. The method of claim 10, wherein the target object comprises graphics for comparison to the image pattern.

16. A joystick assembly for detecting a user input of the joystick assembly, the joystick assembly comprising:
a handle receiving the user input;
a target object connected to the handle,
wherein the target object moves indicative of the input received at the handle;
a camera obtaining a target object image of the target object;
a housing,
wherein the camera and the target object are disposed in the housing,
wherein the target object image is indicative of a position and an orientation of the target object,
wherein the target object and the camera are separated by an air gap for preventing electrical discharge across the air gap;
one or more non-transitory computer-readable media storing computer-executable instructions that, when executed by a processor, perform a method of comparing the target object image with an image pattern, the method comprising the steps of:
comparing the target object image and the image pattern; and
transmitting, using a transmitter, a signal indicative of a difference between the target object image and the image pattern; and
at least one actuator receiving the signal and actuating based on the signal indicative of the difference between the target object and the image pattern.

17. The joystick assembly of claim 16, wherein the at least one actuator controls a position and an orientation of a utility platform, and
wherein a length of the air gap is based at least in part on an electric power associated with utility lines in proximity to the utility platform.

18. The joystick assembly of claim 17, wherein the image pattern comprises graphics to compare to the target object image.

19. The joystick assembly of claim 16, wherein the handle moves with at least four degrees of freedom, and wherein at least one degree of freedom is rotation.

20. The joystick assembly of claim 19, wherein the camera and the processor are powered by a local power supply disposed in the housing of the joystick assembly.

* * * * *